United States Patent
Suetens et al.

(10) Patent No.: US 12,146,205 B2
(45) Date of Patent: Nov. 19, 2024

(54) PROCESS FOR RECYCLING COBALT-BEARING MATERIALS

(71) Applicant: UMICORE, Brussels (BE)

(72) Inventors: Thomas Suetens, Westerlo (BE); David Van Horebeek, Tielt-Winge (BE)

(73) Assignee: UMICORE, Brussels (BE)

( * ) Notice: Subject to any disclaimer, the term of this patent is extended or adjusted under 35 U.S.C. 154(b) by 191 days.

(21) Appl. No.: 16/341,512

(22) PCT Filed: Oct. 16, 2017

(86) PCT No.: PCT/EP2017/076281
§ 371 (c)(1),
(2) Date: Apr. 12, 2019

(87) PCT Pub. No.: WO2018/073145
PCT Pub. Date: Apr. 26, 2018

(65) Prior Publication Data
US 2019/0376159 A1    Dec. 12, 2019

(30) Foreign Application Priority Data

Oct. 21, 2016 (EP) .................................. 16195075

(51) Int. Cl.
*C22B 23/02* (2006.01)
*C22B 7/00* (2006.01)

(52) U.S. Cl.
CPC .............. *C22B 23/02* (2013.01); *C22B 7/001* (2013.01)

(58) Field of Classification Search
CPC ... C22B 23/02; C22B 23/021; C22B 23/0415; C22B 7/001; C22B 7/007; C22B 23/04; C22B 23/07; C22B 23/00; C22B 23/025; C22B 23/026; C22B 23/028; C22B 7/00; C22B 7/002; C22B 15/00; C22B 15/0002; C22B 15/0004; C22B 15/0006; C22B 15/008; C22B 15/001; C22B 15/0013; C22B 15/0015; C22B 15/0017; C22B 15/0019; C22B 15/0021; C22B 15/0023; C22B 15/0026; C22B 15/0028; C22B 15/003; C22B 15/0032; C22B 15/0034; C22B 15/0036; C22B 15/0039; C22B 15/0041; C22B 15/0043; C22B 15/0045; C22B 15/0047; C22B 23/0407; Y02P 10/20

See application file for complete search history.

(56) References Cited

U.S. PATENT DOCUMENTS

| | | | | |
|---|---|---|---|---|
| 4,108,638 A | * | 8/1978 | Nakabe | C22B 15/0054 75/627 |
| 4,814,004 A | | 3/1989 | Kaiura et al. | |
| 6,270,554 B1 | * | 8/2001 | Queneau | C22B 15/0097 266/177 |
| 6,471,743 B1 | * | 10/2002 | Young | C01G 23/047 423/82 |

FOREIGN PATENT DOCUMENTS

| | | | |
|---|---|---|---|
| CN | 101195864 A | 6/2008 | |
| CN | 103924088 A | 7/2014 | |
| CN | 104670130 A | 6/2015 | |
| CN | 104674013 A | 6/2015 | |
| GB | 357366 A | 9/1931 | |
| KR | 100425554 B1 * | 4/2004 | |
| RU | 2013456 C1 | 5/1994 | |
| RU | 2355794 C1 | 5/2009 | |
| RU | 2359047 C2 | 6/2009 | |
| WO | 9720958 A1 | 6/1997 | |
| WO | WO-2008/155451 A1 * | 12/2008 | |
| WO | WO-2011035916 A1 * | 3/2011 | ............. C22B 26/12 |
| WO | 2015096945 A1 | 7/2015 | |
| WO | 2016/023778 A1 | 2/2016 | |

OTHER PUBLICATIONS

Xiao Songwen, Recycling method for Co- and/or Ni-containing waste battery, Jun. 3, 2015, English machine translation of CN-104674013-A (Year: 2015).*
H. M. Finniston, H. Ford, J. M. Alexander, & M. W. Thring. (1973). Metallurgical Processes [and Discussion]. Philosophical Transactions of the Royal Society of London. Series A, Mathematical and Physical Sciences, 275(1250), 313-327. (Year: 1973).*
Lloyd R. Nelson, Gregory A. Georgalli, Keith L. Hines & Rodney J. Hundermark (2019) Converter processing of platinum group metals, Mineral Processing and Extractive Metallurgy, 128:1-2, 134-159, (Year: 2019).*

(Continued)

*Primary Examiner* — George Wyszomierski
*Assistant Examiner* — Nikolas Takuya Pullen
(74) *Attorney, Agent, or Firm* — NK Patent Law

(57) ABSTRACT

The present invention concerns the recovery of cobalt from cobalt-bearing materials, in particular from cobalt-bearing lithium-ion secondary batteries, from the spent batteries, or from their scrap. A process is divulged for the recovery of cobalt from cobalt-bearing materials, comprising the steps of: providing a converter furnace, charging slag formers and one or more of copper matte, copper-nickel matte, and impure alloy into the furnace, and injecting an oxidizing gas so as to smelt the charge in oxidizing conditions, thereby obtaining a molten bath comprising a crude metal phase, and a cobalt-bearing slag, and separating the crude metal from the cobalt-bearing slag, characterized in that the cobalt-bearing materials are charged into the furnace. This process is particularly suitable for recycling cobalt-bearing lithium-ion secondary batteries. Cobalt is concentrated in a limited amount of converter slag, from which it can economically be retrieved, together with other elements such as copper and/or nickel.

9 Claims, No Drawings

(56) References Cited

OTHER PUBLICATIONS

CNIPA; Office Action for Chinese Patent Application No. 201780065141.3 dated Aug. 12, 2020, 13 pages.
ISA/EP; International Search Report and Written Opinion for International Application No. PCT/EP2017/076281 dated Dec. 18, 2017, 9 pages.
Peredeiry, Ilya, "Dissolution of Valuable Metals from Nickel Smelter Slags by Means of High Pressure Oxidative Acid Leaching", PhD thesis by Ilya Perederiy submitted to the Graduate Department of Chemical Engineering and Applied Chemistry University of Toronto, 2011, 122 pages.
WPI Database, Week 201556, Thomson Scientific, London, GB; AN 2015-46721M, XP002767917.
Deng, Tong, et al., "Processing of copper converter slag for metal reclamation. Part I: extraction and recovery of copper and cobalt", Waste Management & Research, Oct. 2007, vol. 25, No. 5, pp. 440-448.
Bulut, Gulay, "Recovery of a copper and cobalt from ancient slag", Waste Management & Research, Apr. 2006, vol. 24, No. 2, pp. 118-124.
Sukla, L.B., et al., "Recovery of Cobalt, Nickel and Copper From Converter Slag Through Roasting With Ammonium Sulphate and Sulphiric Acid", Hydrometallurgy, vol. 16, Issue 2, Jun. 1986, pp. 153-165.
Anand, S., et al., "Pressure Leaching of Copper Converter Slag Using Dilute Sulphuric Acid for the Extraction of Cobalt, Nickel and Copper Values", Hydrometallurgy, vol. 10, Issue 3, Jun. 1983, pp. 305-312.
Jones, RT., et al., "Recovery of cobalt from slag in a DC arc furnace at Chambishi, Zambia", Copper Cobalt Nickel and Zinc Recovery Conference, Victoria Falls, Zimbabwe, Jul. 2001, 11 pages.
UIPV; Office Action for Ukrainian Patent Application No. a 2019 04574 dated Jun. 12, 2020, 7 pages.
CIPO; Office Action for Canadian Patent Application No. 3040045, dated Jan. 29, 2024, 6 pages.

* cited by examiner

PROCESS FOR RECYCLING COBALT-BEARING MATERIALS

CROSS-REFERENCE TO RELATED APPLICATIONS

This application is a U.S. National Stage application of International Application No. PCT/EP2017/076281, filed on 16 Oct. 2017, which claims the benefit of European Patent Application No. 16195075.3, filed 21 Oct. 2016.

The present invention concerns the recovery of cobalt from cobalt-bearing materials, in particular from cobalt-bearing lithium-ion secondary batteries, from spent batteries or from their scrap.

Using existing large-scale equipment and adding or incorporating the cobalt-bearing materials to the usual feed may provide an interesting alternative to a fully dedicated processing plant. This may be particularly true for cobalt-bearing batteries when the volumes to be treated are limited.

A possible candidate for such a large-scale process is the tandem formed by smelter and converter furnaces as used for treating copper or copper-nickel bearing ores, concentrates, or recyclates. This more specifically comprises: a smelter, operating in mildly oxidizing conditions, producing a copper matte, a copper-nickel matte, or an impure alloy, and a slag; and, a converter for the treatment of the matte or the impure alloy, operating in oxidizing conditions, producing a crude metal and a slag. In representative industrial operations, the smelter slag will contain significant amounts of iron when operating on ores. The converter slag will contain significant amounts of copper and/or nickel. This slag will normally be recycled to the smelter to ensure high global copper and nickel yields. The smelter slag may be discarded or re-used, e.g. as aggregate in concrete.

WO 2015/096945 proposes a process for the recovery of copper and nickel from lithium-ion batteries by replacing part of a sulfidic smelter charge by lithium-ion batteries or their scrap. Thanks to their high content in carbon and metallic aluminum, they substitute for fuel and reducing agents in the smelter. The nickel in the batteries reports mainly to the matte, together with copper. Both metals can be recovered and separated in further steps, according to known processes. The slag contains iron, and almost no nickel. It is therefore compatible with ecological re-use.

A first disadvantage of the above process is that it is appropriate for materials with a low cobalt content only. Unlike nickel, cobalt reports essentially to the slag, in the form of metal oxide. The precise distribution amongst the phases depends upon the redox potential during the process. Cobalt is a highly valuable metal that is preferably recovered with high yields. It is moreover toxic, especially as an oxide. For these two reasons, the amount of cobalt that can be tolerated in the smelter slag is very low, and should preferably remain below 3000 ppm or 0.3%, depending on local legislation and the envisaged re-use.

This disadvantage is particularly significant in relation to lithium-ion secondary batteries. While some batteries such as lithium-iron-phosphate (LFP) and lithium-manganese-oxide (LMO) based batteries contain little or no cobalt, most popular batteries such as lithium cobalt oxide (LCO) and lithium-nickel-manganese-cobalt (NMC) based batteries contain about 5 to 20% of cobalt in their cathode.

A second disadvantage of this process is related to the amount of alumina in the smelter slag. From a practical point of view, up to 6% is considered as an upper bound. Higher concentrations may be used, but the increased melting point and viscosity of the slag necessitates a higher working temperature. This tends to degrade the energy efficiency and the useful life of the smelter.

This disadvantage is again particularly significant in relation to lithium-ion secondary batteries. Alumina is indeed formed from the aluminum metal present in batteries, either as support sheets for the electrodes, or as canning material. The relative amount of batteries that can be added to the smelter charge is therefore limited. This results in the dilution of the cobalt in the smelter slag.

It is therefore the aim of the present divulgation to present an alternative process, which is suitable for recycling cobalt-bearing materials such as most popular lithium secondary batteries.

It has now been found that cobalt, unlike nickel, when introduced directly in a converter, will nearly completely report to the slag.

Moreover, the limit of 6% alumina in the smelter slag, which restricts the quantity of batteries that can be fed to a smelter, can be disregarded in converter slags, as the working temperature of a converter is usually much higher than that of a smelter. This allows for a higher relative amount of batteries in the feed, and for the concentration of the cobalt in the converter slag.

A converter slag is thus obtained that is potentially much richer in cobalt than what is possible in a smelter slag. This slag also contains residual copper. It should not be recirculated as such to the smelter, but subjected to a process for recovery of cobalt and copper.

Accordingly, a process is divulged for the recovery of cobalt from cobalt-bearing materials, comprising the steps of: providing a converter furnace; charging slag formers and one or more of copper matte, copper-nickel matte, and impure alloy into the furnace, and injecting an oxidizing gas so as to smelt the charge in oxidizing conditions, thereby obtaining a molten bath comprising a crude metal phase, and a cobalt-bearing slag; and, separating the crude metal from the cobalt-bearing slag, characterized in that the cobalt-bearing materials are charged into the furnace.

By converter furnace is meant a furnace suitable to conduct converting operations. This normally implies provisions for the injection of an oxidizing gas such as air, enriched air or pure oxygen, into the melt. Sulfidic sulfur, if present, is hereby oxidized to sulfur dioxide. By matte are meant sulfidic materials such as copper and nickel sulfides. By impure alloy is meant an alloy containing copper ("black copper") and/or nickel, and also comprising other elements such as iron, antimony, and tin. By crude metal is meant a metallic phase such as crude copper or blister copper, optionally containing nickel and other metallic impurities. Slag formers typically comprise lime and silica.

Charging the cobalt-bearing materials should be performed either before the converting operation actually starts, or else during this operation. Said materials could be added to the other fractions of the charge or the slag formers, or entraining into the melt by pneumatic means.

The yield of cobalt in the slag can be optimized by adjusting the amount of oxidizing gas during the converting operations. This allows for the recovery of more than 90% by weight of the cobalt present in the cobalt-bearing materials.

The process is particularly suitable for the recovery of cobalt from cobalt-bearing materials comprising secondary batteries, spent batteries, or their scrap. The cobalt concentration that can reasonably be expected in the slag when working in preferred conditions amount to between 2% and 20% by weight. The term battery scrap includes shredded batteries, selected battery fractions after e.g. shredding, and roasted batteries.

In a further embodiment, process steps are included for the recovery of cobalt and copper from the slag. This recovery may involve acidic aqueous leaching operation(s) or a step of reducing smelting.

It should be noted that the smelting step with the production of copper or copper-nickel matte, or an impure alloy, and the converting step with the production of a crude metal from copper or copper-nickel matte, or an impure alloy, can be performed either in separate equipment, or else consecutively in the same equipment. When using the same equipment, it is assumed that the slag from the smelting step is tapped before initiating the converting step. According to the invention, cobalt-bearing batteries are then fed in the converting step. Furthermore, the optional step of recovering the copper and cobalt involving a deep reducing step, as explained in the second option below, may again be performed using the same equipment.

There are several known options for the recovery of cobalt and copper from the converter slag. A first option is a hydrometallurgy treatment, wherein the slag is leached or dissolved. The different metals, where under residual copper and cobalt are then recovered according to known processes such as filtration, precipitation and solvent extraction. Aim of such a hydrometallurgical dissolution step is to selectively recover valuable metals like copper and cobalt; any co-dissolution of iron and alumina however would have a negative influence on the economic performance of the process, because of the increased consumption of reagents (both for the dissolution and the downstream removal) and the low value of these metallic impurities.

Several hydrometallurgical processes for the dissolution of cobalt and copper from said slags are described in literature. Deng (Waste Manag. Res. 2007 October; 25(5): 440-81) reports the dissolution of not only cobalt and copper, but also iron from a slag that has first been roasted with sulfuric acid. In the suggested flowsheet, iron is valorized as ferrous sulfate (after crystallization). A similar dissolution process is proposed by Buluth (Waste Manag. Res. 2006 April; 24(2):118-242). His work shows that a normal sulfuric acid leaching process gives slightly higher dissolution yields for copper and cobalt than water leaching of the same slag after sulfuric acid roasting at 200° C. Sukla (Hydrometallurgy, Volume 16, Issue 2, June 1986, Pages 153-165) also describes the water washing of slags that were roasted with either sulfuric acid or ammonium sulfate, and reports leach yields for both copper, cobalt and iron that are all above 90%.

In order to eliminate both the expensive roasting step and the dissolution of iron, several processes are reported that use oxidative leaching in an autoclave. Anand (Hydrometallurgy, Volume 10, Issue 3, June 1983, Pages 305-312) describes a process which is operated under pressure using dilute sulfuric acid and shows that even at high cobalt and copper yields, the co-dissolution of iron can be avoided. Perederiy ("Dissolution of Valuable Metals from Nickel Smelter Slags by Means of High Pressure Oxidative Acid Leaching", PhD thesis by Ilya Perederiy, University of Toronto, 2011) comes to similar conclusions and demonstrates that at sufficiently high temperature and oxygen pressure, iron can be precipitated as crystalline hematite while cobalt and copper dissolves.

A second option is by pyro-metallurgy. A separate slag cleaning process is applied, exposing the slag to deep reduction, e.g. using an arc furnace under addition of carbon. Such a process is described in "Recovery of cobalt from slag in a DC arc furnace at Chambishi, Zambia", RT Jones et al., Copper Cobalt Nickel and Zinc Recovery conference, Victoria Falls, Zimbabwe, 16-18 Jul. 2001. Another process for slag cleaning under very reducing conditions is described in WO 2016/023778.

TABLE 1

Reference charge on smelter, without cobalt-bearing materials (comparative Example 1)

Smelter

| Input | Feed rate (t/h) | S | Cu | Ni | Fe (FeO) | Co (CoO) | Mn (MnO) | Al ($Al_2O_3$) | Si ($SiO_2$) | Li ($Li_2O$) |
|---|---|---|---|---|---|---|---|---|---|---|
| Charge | 100 | 18 | 25 | 0.6 | 20 | — | — | — | — | — |
|  |  |  |  |  |  |  |  | 1 | 15 | — |
| Flux | 20 | — | — | — | — | — | — | — | 100 | — |
| Output |  |  |  |  |  |  |  |  |  |  |
| Matte | 40 | 25 | 60 | 1.35 | 10.0 | — | — | — | — | — |
| Slag | 88.5 | — | 1.13 | 0.1 | — | — | — | — | — | — |
|  |  | — |  |  | 23.2 | — | — | 1.13 | 39.5 | — |

Converter

| Input | Feed rate (t/h) | S | Cu | Ni | Fe (FeO) | Co (CoO) | Mn (MnO) | Al ($Al_2O_3$) | Si ($SiO_2$) | Li ($Li_2O$) |
|---|---|---|---|---|---|---|---|---|---|---|
| Matte | 40 | 25 | 60 | 1.35 | 10 | — | — | — | — | — |
| Flux | 2.5 | — | — | — | — | — | — | — | 100 | — |
| Output |  |  |  |  |  |  |  |  |  |  |
| Blister | 24.0 | — | 98 | 2 | — | — | — | — | — | — |
| Slag | 10 | — | 4.8 | 0.6 | — | — | — | — | — | — |
|  |  | — |  |  | 51.5 | — | — | — | 25 | — |

This comparative Example 1 illustrates operating conditions for smelter and converter equipment working in tandem to treat typical copper-iron sulfidic ores. The matte produced in the smelter is fed to the converter. No batteries are added in this Example. The smelter is operated at a mean temperature of about 1175° C.

The converter slag still contains a substantial amount of copper and will typically be recycled to the smelter. Alumina is suitably low in the smelter slag, and insignificant in the converter slag. The smelter slag is clean and suitable for re-use. The converter is operated at a mean temperature of about 1300° C.

TABLE 2

Reference charge with cobalt-bearing materials on smelter (comparative Example 2)

Smelter

| | | Composition (%) | | | | | | | | |
|---|---|---|---|---|---|---|---|---|---|---|
| Input | Feed rate (t/h) | S | Cu | Ni | Fe (FeO) | Co (CoO) | Mn (MnO) | Al (Al$_2$O$_3$) | Si (SiO$_2$) | Li (Li$_2$O) |
| Charge | 100 | 18 | 25 | 0.6 | 20 | — | — | — | — | — |
| Flux | 25 | — | — | — | — | — | — | 1 | 15 | — |
| Batteries | 20 | — | 10 | 4 | 14 | 10 | 2 | — | 100 | — |
| | | | | | | | | 12 | 0 | 4.1 |
| Output | | | | | | | | | | |
| Matte | 43.76 | 25 | 59.2 | 2.88 | 10.4 | 0.91 | — | — | — | — |
| Slag | 104.3 | — | 1.04 | 0.13 | — | 2.05 | — | — | — | — |
| | | | | | 22.5 | | 0.495 | 5.31 | 38.4 | 0.786 |

Converter

| | | Composition (%) | | | | | | | | |
|---|---|---|---|---|---|---|---|---|---|---|
| Input | Feed rate (t/h) | S | Cu | Ni | Fe (FeO) | Co (CoO) | Mn (MnO) | Al (Al$_2$O$_3$) | Si (SiO$_2$) | Li (Li$_2$O) |
| Matte | 43.76 | 25 | 59.23 | 2.88 | 10.4 | 0.91 | — | — | — | — |
| Flux | 2.9 | — | — | — | — | — | — | — | 100 | — |
| Output | | | | | | | | | | |
| Blister | 26.6 | — | 95.4 | 4.64 | — | — | — | — | — | — |
| Slag | 11.36 | — | 4.56 | 0.22 | — | — | — | — | — | — |
| | | | | | 51.6 | 4.48 | | | 25.5 | |

This comparative Example 2 illustrates typical working conditions for the smelter and converter equipment treating copper-iron sulfidic ores similar to comparative Example 1, with however the difference that cobalt-bearing lithium-ion secondary batteries are fed to the smelter. The matte produced in the smelter is fed to the converter. The operating temperatures are according to Example 1.

Alumina in the smelter slag amounts to more than 5%, a figure indicating that the amount of batteries in the feed is against its upper bound.

Cobalt thus gets diluted in the smelter slag and in the converter slag, in concentrations rendering recovery particularly arduous and expensive.

TABLE 3

Reference charge with cobalt-bearing materials on converter (Example according to the invention)

Smelter

| | | Composition (%) | | | | | | | | |
|---|---|---|---|---|---|---|---|---|---|---|
| Input | Feed rate (t/h) | S | Cu | Ni | Fe (FeO) | Co (CoO) | Mn (MnO) | Al (Al$_2$O$_3$) | Si (SiO$_2$) | Li (Li$_2$O) |
| Charge | 100 | 18 | 25 | 0.6 | 20 | — | — | — | — | — |
| Flux | 20 | — | — | — | — | — | — | 1 | 15 | — |
| | | | | | | | | — | 100 | — |
| Output | | | | | | | | | | |
| Matte | 40 | 25 | 60 | 1.35 | 10.0 | — | — | — | — | — |
| Slag | 88.5 | — | 1.13 | 0.1 | — | — | — | — | — | — |
| | | | | | 23.3 | | | 1.13 | 39.5 | — |

TABLE 3-continued

Reference charge with cobalt-bearing materials on converter (Example according to the invention)

| | | Converter | | | | | | | | |
|---|---|---|---|---|---|---|---|---|---|---|
| | | Composition (%) | | | | | | | | |
| Input | Feed rate (t/h) | S | Cu | Ni | Fe (FeO) | Co (CoO) | Mn (MnO) | Al (Al$_2$O$_3$) | Si (SiO$_2$) | Li (Li$_2$O) |
| Matte | 40 | 25 | 60 | 1.35 | 10 | — | — | — | — | — |
| Flux | 4.3 | — | — | — | — | — | — | — | 100 | — |
| Batteries | 20 | — | 10 | 4 | 14 | 10 | 2 | 12 | 0 | — |
| | | | | | — | — | — | — | — | 4.1 |
| Output | | | | | | | | | | |
| Blister | 26.2 | — | 95.1 | 4.9 | — | — | — | — | — | — |
| Slag | 28.9 | — | 3.60 | 0.19 | — | — | — | — | — | — |
| | | — | | | 30.2 | 8.79 | 1.78 | 15.7 | 14.9 | 2.83 |

This Example according to the invention illustrates typical working conditions for the smelter and converter equipment treating copper-iron sulfidic ores similar to comparative Examples 1 and 2, with however the difference that cobalt-bearing lithium-ion secondary batteries are fed to the converter instead of to the smelter. The matte produced in the smelter is also fed to the converter. The operating temperatures are according to Examples 1 and 2.

Alumina is suitably low in the smelter slag, but amounts to 15.7% in the converter slag. As explained above, such a high alumina concentration is acceptable in view of the conditions prevailing in a converter.

The smelter slag contains no cobalt, the cobalt being now concentrated in a low amount of converter slag. It is suitable for ecological re-use. The economic recovery of cobalt from the converter slag is rendered possible.

The invention claimed is:

1. Process for the recovery of cobalt from cobalt-bearing materials, comprising:
   providing a converter furnace;
   feeding cobalt-bearing materials, slag formers, and oner or more of copper matte, copper-nickel matte, and impure alloy containing copper and/or nickel into the converter furnace,
   injecting an oxidizing gas into the converter furnace, thereby oxidizing any sulfidic materials present in the copper matte or copper-nickel matte to form sulfur dioxide, and obtaining a molten bath in the converter furnace comprising a crude metal phase and a cobalt-bearing slag, but free of sulfur; and,
   separating the crude metal phase from the cobalt-bearing slag;
   wherein the cobalt-bearing materials comprise secondary batteries, spent batteries, or their scrap and wherein more than 90% by weight of the cobalt present in the cobalt-bearing materials is recovered in the cobalt-bearing slag.

2. Process according to claim 1, wherein the more than 90% by weight of the cobalt present in the cobalt-bearing materials is recovered in the cobalt-bearing slag, by adjusting the amount of oxidizing gas.

3. Process for the recovery of cobalt from cobalt-bearing materials according to claim 1, wherein the cobalt in the cobalt-bearing slag amounts to between 2% and 20% by weight.

4. Process for the recovery of cobalt from cobalt-bearing materials according to claim 1, further comprising a step of recovering cobalt and copper from the cobalt-bearing slag.

5. Process for the recovery of cobalt from cobalt-bearing materials according to claim 4, wherein the step of recovering cobalt and copper from the cobalt-bearing slag comprises an acidic aqueous leaching operation.

6. Process for the recovery of cobalt from cobalt-bearing materials according to claim 4, wherein the step of recovering cobalt and copper from the cobalt-bearing slag comprises a reducing smelting operation.

7. Process of claim 1, comprising feeding cobalt-bearing materials, slag formers, impure alloy and one or more of copper matte and copper-nickel matte into the converter furnace.

8. Process of claim 1, wherein the converter furnace is operated in tandem with a smelter.

9. Process of claim 1, further comprising a smelting step, wherein the one or more of copper matte, copper-nickel matte, and impure alloy are produced in the smelting step.

* * * * *